United States Patent
Suzuki et al.

(10) Patent No.: US 8,013,483 B2
(45) Date of Patent: Sep. 6, 2011

(54) HYBRID DRIVE DEVICE

(75) Inventors: Haruhisa Suzuki, Nishikamo-gun (JP); Masatoshi Adachi, Nishikamo-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 156 days.

(21) Appl. No.: 12/451,337

(22) PCT Filed: May 9, 2008

(86) PCT No.: PCT/IB2008/001154
§ 371 (c)(1),
(2), (4) Date: Nov. 6, 2009

(87) PCT Pub. No.: WO2008/139305
PCT Pub. Date: Nov. 20, 2008

(65) Prior Publication Data
US 2010/0133930 A1    Jun. 3, 2010

(30) Foreign Application Priority Data
May 11, 2007    (JP) .................................. 2007-126537

(51) Int. Cl.
*H02K 9/00*    (2006.01)
(52) U.S. Cl. ........................................................ 310/54
(58) Field of Classification Search .................... 310/54, 310/52, 58, 64; 180/339; 475/331
See application file for complete search history.

(56) References Cited

U.S. PATENT DOCUMENTS

| 4,418,777 A * | 12/1983 | Stockton ...................... 180/65.6 |
| 7,239,055 B2 * | 7/2007 | Burgman et al. ................ 310/52 |
| 7,508,100 B2 * | 3/2009 | Foster ............................ 310/54 |
| 2007/0111847 A1 * | 5/2007 | Inagaki et al. ................ 475/331 |

FOREIGN PATENT DOCUMENTS

| JP | A 05-330348 | 12/1993 |
| JP | A 08-318741 | 12/1996 |
| JP | A 2001-112210 | 4/2001 |
| JP | A 2003-169448 | 6/2003 |
| JP | A 2003-336725 | 11/2003 |
| JP | A 2004-066898 | 3/2004 |
| JP | A 2004-353780 | 12/2004 |
| JP | A 2006-175951 | 7/2006 |
| JP | A 2007-001444 | 1/2007 |
| JP | A 2007-001487 | 1/2007 |

OTHER PUBLICATIONS

International Search Report mailed Jun. 11, 2008 for National Phase Application No. PCT/IB2008/001154, filed May 9, 2008.
Written Opinion of the International Searching Authority mailed Jun. 11, 2008 for National Phase Application No. PCT/IB2008/001154, filed May 9, 2008.
International Preliminary Report on Patentabilty completed Aug. 17, 2009 for National Phase Application No. PCT/IB2008/001154, filed May 9, 2008.
Japanese Office Action with English-language translation thereof for Japanese Patent Application No. 2007-126537 mailed Feb. 3, 2009.

* cited by examiner

*Primary Examiner* — Nguyen N Hanh
(74) *Attorney, Agent, or Firm* — Oliff & Berridge, PLC

(57) ABSTRACT

The hybrid drive device wherein: a case space is divided by a partition wall into a first case part and a second case part; a drive electric motor is provided in the first case part; a friction engagement element is provided in the second case part; and a through hole that communicates the case spaces is formed.

11 Claims, 5 Drawing Sheets

LEFT SIDE ⟵⟶ RIGHT SIDE

HYBRID DRIVE DEVICE

BACKGROUND OF THE INVENTION

1. Field of the Invention

The present invention relates to a hybrid drive device, and in particular to a hybrid drive device mounted on a hybrid vehicle to improve the cooling performance for a winding wire of a stator.

2. Description of the Related Art

Generally, in conventional hybrid drive devices mounted on hybrid vehicles, a plurality of friction engagement elements, such as clutches and brakes, which are actuated by an engagement pressure supplied to a hydraulic servo are provided within the case of the hybrid drive device, and the transmission paths of the driving force from the internal combustion engine and from an electric motor are changed through a planetary gear unit according to the differential motion of the clutches and the brakes to transmit the driving forces to driving wheels located downstream while changing their rotational speeds and torques.

In general, the electric motor of a hybrid vehicle includes a stator having a wire wound around the outer periphery of a core fixed to a case, and a rotor provided at the inner peripheral part of the stator for free rotation. Because a large current flows through the wire, the temperature of the stator increases and the torque of the motor is reduced, the stator and the rotor need to be cooled.

Japanese Patent Application Publication No. 8-318741 (JP-A-08-318741), for example, discloses a hybrid vehicle in which a rotor is formed with a cylinder and a hydraulic actuator that supplies and discharges oil is provided in the cylinder. Oil discharged from an oil pump to cooling the rotor is introduced into the cylinder by the hydraulic actuator, and the oil is then supplied to the rotor by the hydraulic actuator, to cool the rotor and the stator.

Of the friction engagement elements described above, a brake provided in the planetary gear unit includes a plurality of separator plates attached to the inner peripheral part of a case, and a plurality of friction plates provided to the outer peripheral part of a ring gear and interposed between the separator plates. In this brake, when the separator plates are pressed by a hydraulic cylinder, the separator plates and the friction plates are engaged with each other. This engagement makes the ring gear stationary relative to the case, which changes the transmission path of the driving force.

In order to prevent of the friction plates and the separator plates from seizing up, Japanese Patent Application Publication No. 2007-1444 (JP-A-2007-1444) discloses a drive device in which the friction plates and the separator plates are supplied with oil for cooling.

In the drive device in which oil is supplied to the brake for cooling described in JP-A-2007-1444, oil is supplied from an oil pump to a supply hole formed in a rotary shaft of the planetary gear unit in the axial direction. The oil is then supplied to radial holes formed in a sun gear and a pinion gear of the planetary gear unit through radial holes formed in the rotary shaft and radially penetrating the supply hole, and then to the friction plates and the separator plates located on the outer peripheral part of the ring gear utilizing a centrifugal force due to rotation of the planetary gear unit.

In the hybrid drive device, however, the electric motor and the planetary gear that includes the friction engagement elements are housed separately from each other, with a partition wall interposed therebetween, in the case of the hybrid drive device, in order to support a bearing for the rotor and form a cylinder chamber in the brake. Therefore, two systems of oil supply paths are required to supply oil from the oil pump to both the electric motor and the friction engagement element, which necessitates the use of an oil pump having increased capacity.

In particular, because the winding wire which becomes hot is located on the outer side of the rotor in radial directions, a high-pressure oil pump must be used to supply oil from the hydraulic actuator provided in the rotor to the winding wire. Thus, the need to drive the high-capacity oil pump by the internal combustion engine may reduce the fuel efficiency of the vehicle.

SUMMARY OF THE INVENTION

The present invention provides a hybrid drive device that more efficiently cools an electric motor without requiring an increase in the capacity of an oil pump, thus avoiding deterioration in the fuel economy of a vehicle.

An aspect of the present invention provides a hybrid drive device including: a case main body having i) at least one partition wall, ii) a first case part and iii) a second case part in which a first space and a second space divided by the partition wall are respectively formed; an electric motor that includes i) a stator fixed to the first case part and having a winding wire, ii) a rotor shaft provided in the stator for free rotation, and iii) a rotor fixed to the rotor shaft; a rotary shaft being coaxial with the rotor shaft and rotatable together with the rotor shaft; a friction engagement element that includes i) a first friction member spline-coupled to an inner peripheral part of the second case part, ii) a hub supported by the rotary shaft, and iii) a second friction member that is spline-coupled to the hub and that is frictionally or non-frictionally engaged with the first friction member; and lubricant supply means for supplying lubricant to the friction engagement element, the friction engagement element being provided in the vicinity of the partition wall, the hybrid drive device being characterized in that a through hole that communicates the first space and the second space is formed in the partition wall while facing the friction engagement element.

In the hybrid drive device in accordance with the aboveaspect, the through hole may be formed in the partition wall at an inner peripheral part of the case main body.

According to this configuration, the through hole that communicates the first space and the second space is formed in the partition wall, and the through hole is formed at the inner peripheral part of the second case part positioned in the vicinity of the friction engagement element. Therefore, when lubricant is supplied to the friction engagement element, the lubricant is supplied from the second case part through the through hole to the first case part.

In the hybrid drive device in accordance with the aboveaspect, the stator may be fixed to an inner peripheral part of the first case part.

In the hybrid drive device in accordance with the aboveaspect, after the lubricant may be supplied to the friction engagement element, the lubricant may be supplied to the second space, the through hole, and the first space in sequence to cool the winding wire.

In the hybrid drive device in accordance with the aboveaspect, the lubricant supply means may supply some of the lubricant to the friction engagement element while supplying others to cool the rotor.

According to this configuration, because the stator is fixed to the inner peripheral part, the winding wire which becomes hot may be cooled by the lubricant supplied through the through hole.

Thus, the lubricant supplied to the friction engagement elements may be supplied to the winding wire positioned at the radially outer side of the rotor. Therefore, the system that supplies lubricant to cool the electric motor may be simplified so that only the rotor is cooled. Consequently, it is possible to prevent an increase in the capacity of the oil pump to efficiently cool the electric motor, and to prevent deterioration in the fuel economy of the vehicle.

In the hybrid drive device in accordance with the above aspect, the friction engagement element may control power input to the hub by serving as a part of a transmission that transmits power which is input to the rotor shaft to the rotary shaft after changing gear speed.

According to this configuration, the lubricant supplied to the brake mechanism provided in the transmission may be supplied to the winding wire positioned at the radially outer side of the rotor. Therefore, the system that supplies lubricant to cool the electric motor may be simplified so that only the rotor is cooled. Consequently, it is not necessary to increase the capacity of the oil pump to efficiently cool the electric motor adjacent to the transmission, thus avoiding deterioration in the fuel economy of the vehicle.

In the hybrid drive device in accordance with the above aspect, the friction engagement element may control power input to the hub by serving as a part of a power distribution device that distributes power which is input to the rotary shaft to the rotor shaft and an output shaft.

According to this configuration, the lubricant supplied to the brake mechanism of the power distribution device may be supplied to the winding wire positioned at the radially outer side of the rotor. Therefore, the system that supplies lubricant to cool the electric motor may be simplified so that only the rotor is cooled. Consequently, it is not necessary to increase the capacity of the oil pump to efficiently cool the electric motor adjacent to the power distribution device, thus avoiding deterioration in the fuel economy of the vehicle.

In the hybrid drive device in accordance with the above aspect, the friction engagement element may be a brake mechanism.

In the hybrid drive device in accordance with the above aspect, a spline groove may be formed in the inner peripheral part of the second case part, a spline may be formed on an outer peripheral part of the first friction member, the spline may be fitted with the spline groove; and the through hole may be formed in the partition wall so as to communicate with the spline groove.

According to this configuration, the through hole is formed in the partition wall so as to communicate with the spline groove formed in the inner peripheral part of the second case part. Therefore, a sufficient space may be secured to form the through hole.

In the hybrid drive device in accordance with the above aspect, a plurality of the through holes may be provided along a circumferential direction of the first case part.

In the hybrid drive device in accordance with the above aspect, the same number of said through holes as there are of said spline grooves may be provided.

The hybrid drive device in accordance with the above aspect may further include: a pipe member having a first end and a second end, wherein the first end being attached to an opening end of the through hole on the first case part side, and the second end extending toward the winding wire from the first end.

According to this configuration, the lubricant is supplied to the winding wire from the pipe member provided at the opening end of the through hole. Therefore, with the second end of the pipe member directed toward a desired position of the winding wire, the desired position of the winding wire may be easily cooled more efficiently.

BRIEF DESCRIPTION OF THE DRAWINGS

The foregoing and/or further objects, features and advantages of the invention will become more apparent from the following description of preferred embodiment with reference to the accompanying drawings, in which like numerals are used to represent like elements and wherein.

DETAILED DESCRIPTION OF EMBODIMENTS

Embodiments of the present invention will hereinafter be described with reference to the drawings.

Figure 1:
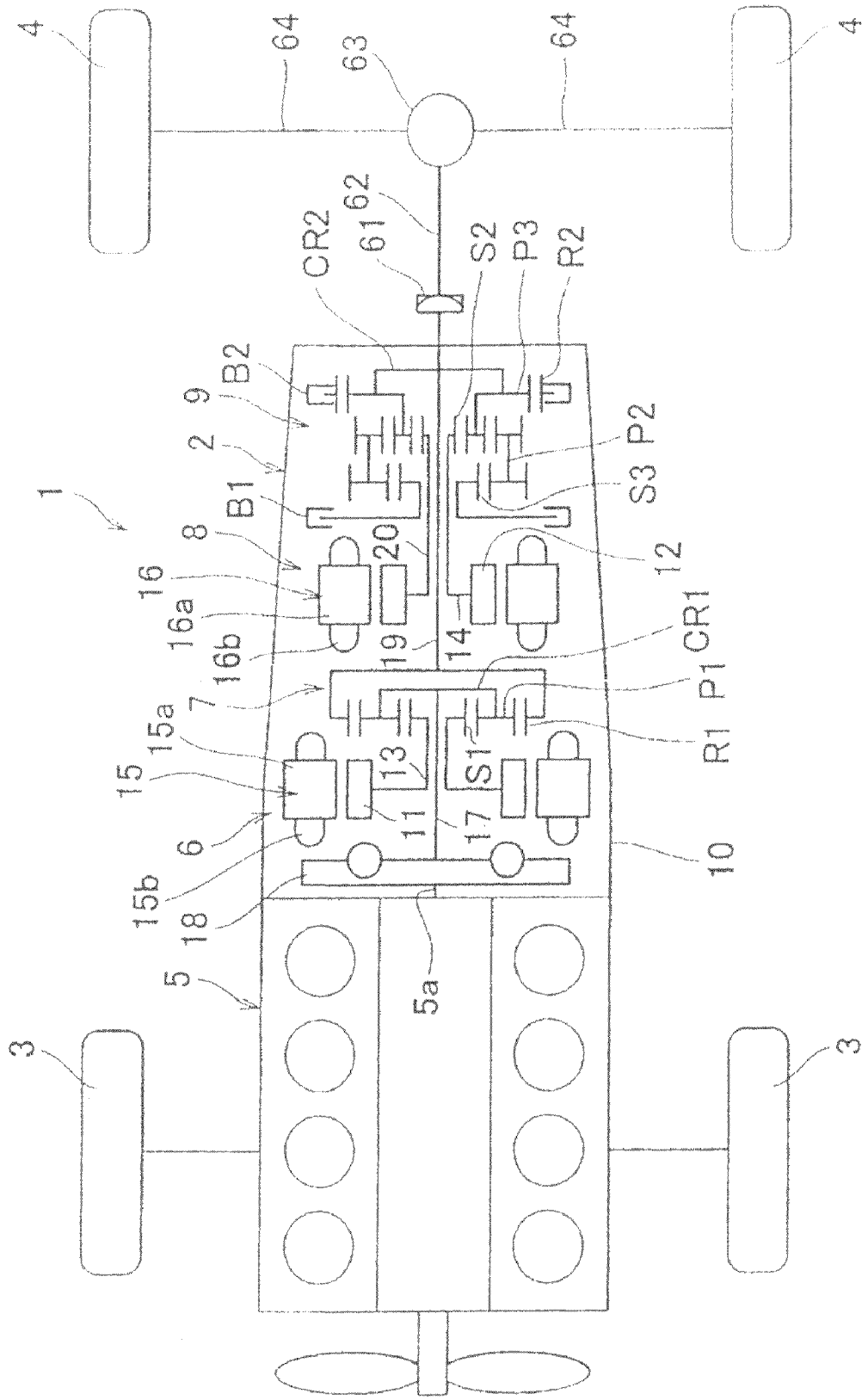
FIG. 1 is a schematic diagram showing a configuration of a hybrid drive device in accordance with a first embodiment of the present invention.
Figure 2:
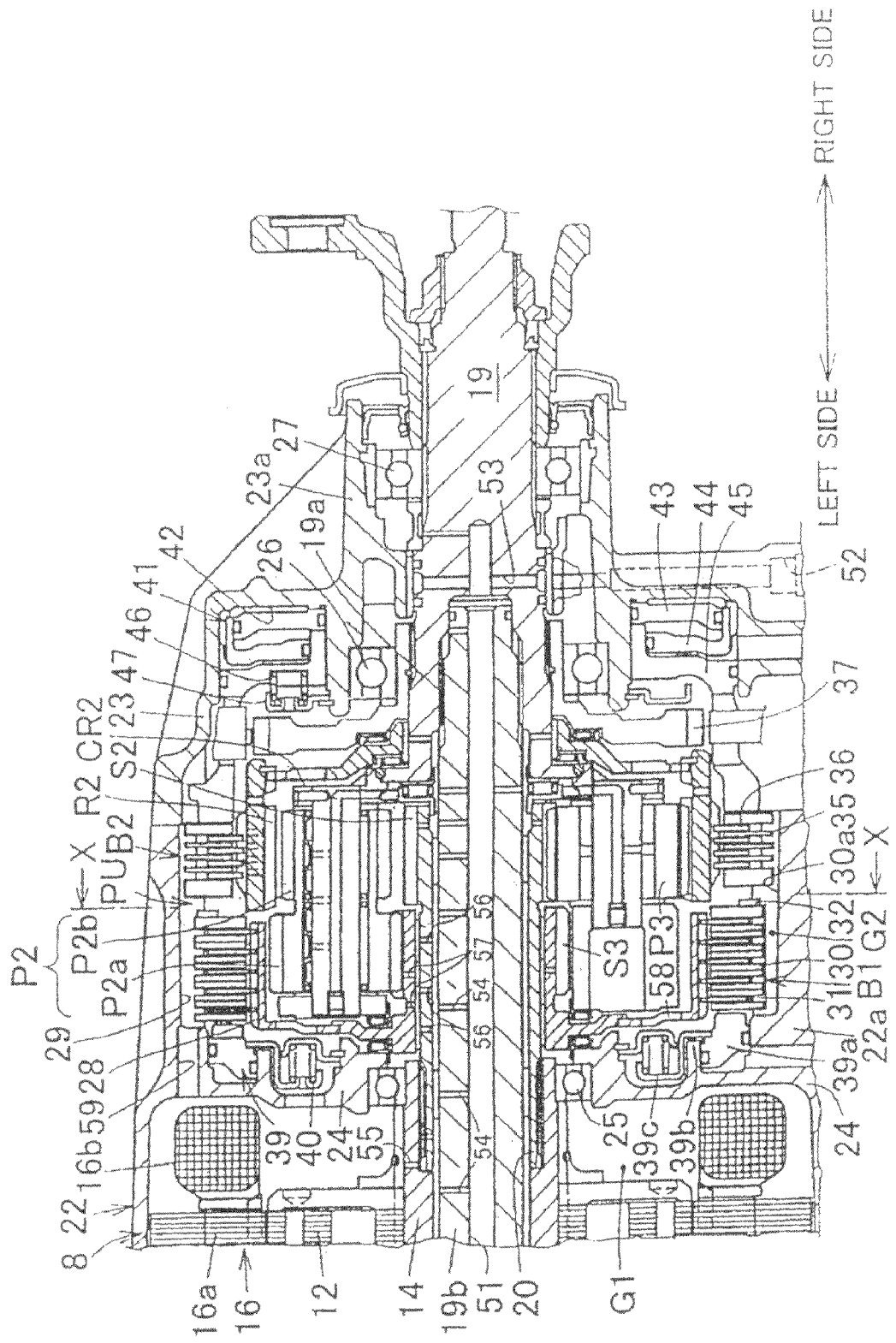
FIG. 2 is a cross sectional view showing a part of an automatic gear shift device and a drive electric motor of the hybrid drive device in accordance with the first embodiment of the present invention.
Figure 3:
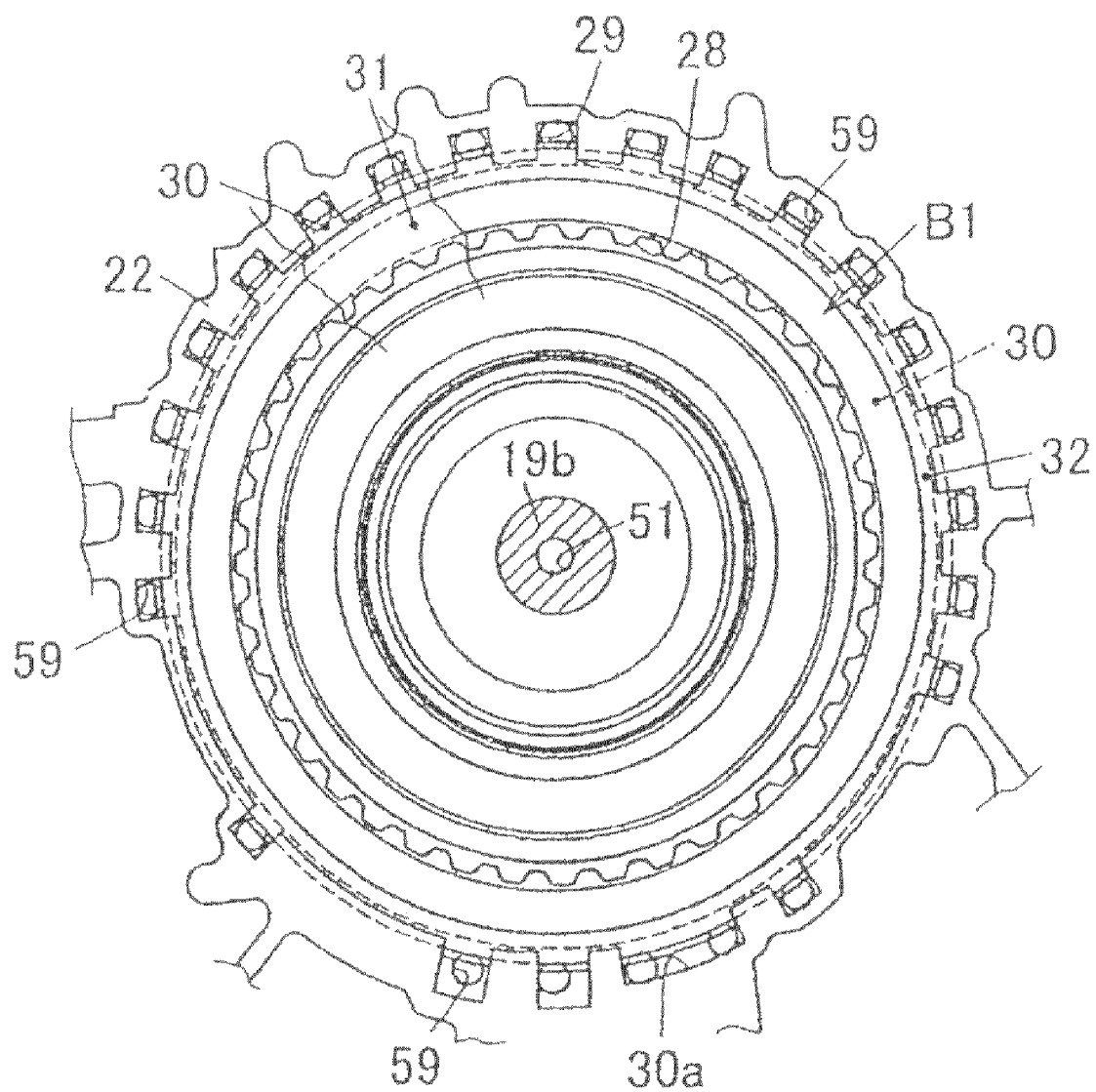
FIG. 3 is a cross sectional view taken along the line X-X of FIG. 2.
Figure 4:
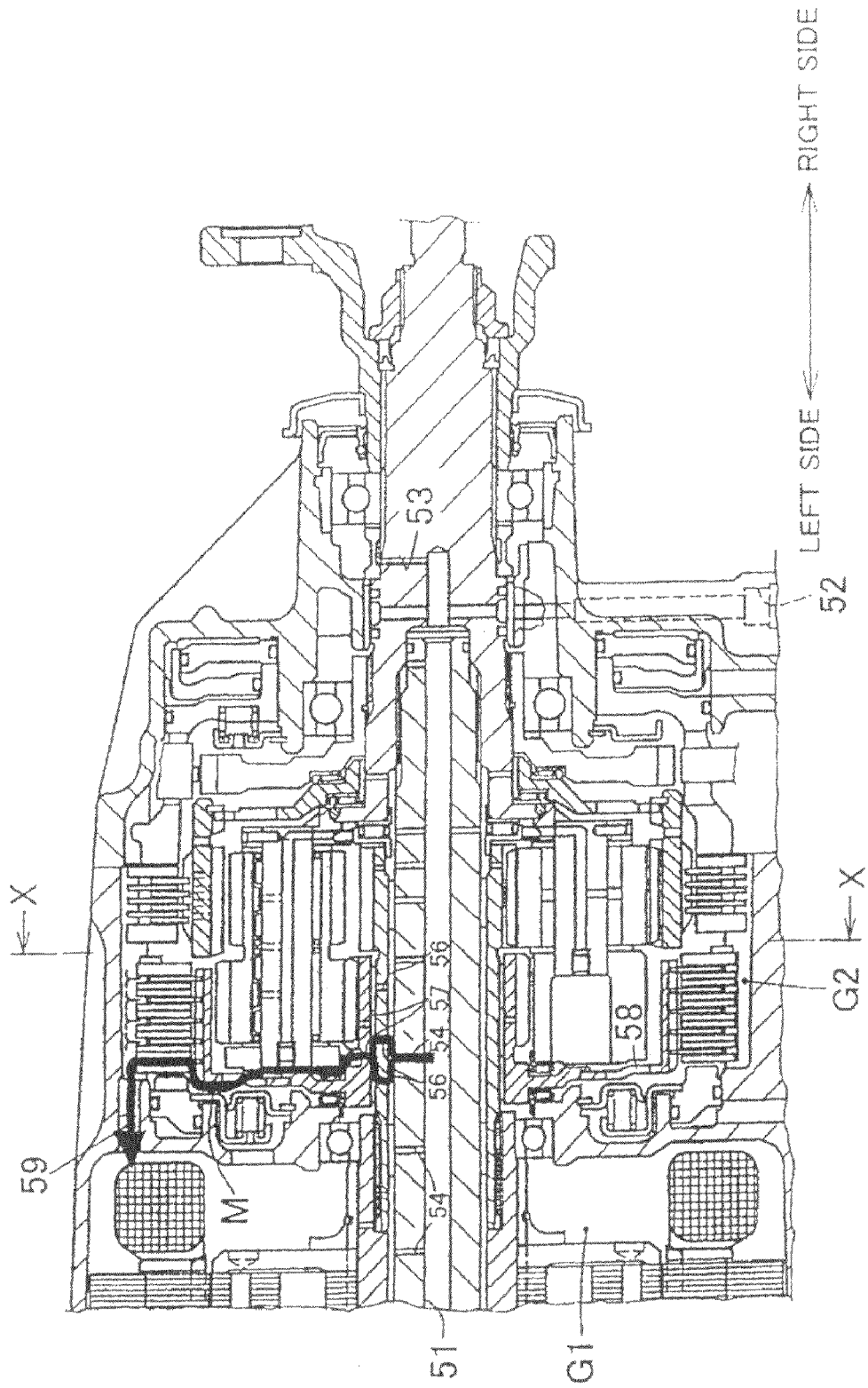
FIG. 4 shows the flow of lubricant in the hybrid drive device in accordance with the first embodiment of the present invention.

FIG. 1 is a schematic diagram showing the configuration of a hybrid drive device in accordance with a first embodiment of the present invention. FIG. 2 is a cross sectional view showing a part of an automatic gear shift device and a drive electric motor of the hybrid drive device in accordance with the first embodiment of the present invention. FIG. 3 is a cross sectional view taken along the line X-X of FIG. 2. FIG. 4 shows the flow of lubricant in the hybrid drive device in accordance with the first embodiment of the present invention. In this embodiment, the hybrid drive device in accordance with the present invention is applied to a front engine, rear drive (FR) vehicle.

As shown in FIG. 1, a vehicle 1 is provided with a hybrid drive device 2. Left and right front wheels 3 and left and right rear wheels 4 are suspended from a vehicle body (not shown) of the vehicle 1. In a front portion of the vehicle body, an internal combustion engine 5 is mounted via a rubber mount with a crankshaft that extends in the fore and aft direction.

The hybrid drive device 2 includes a control electric motor 6, a power-distribution planetary gear 7, and a drive electric motor 8, which are disposed on the crankshaft in the stated order from the internal combustion engine 5 side. A transmission 9 is disposed behind the drive electric motor 8.

The hybrid drive device 2 is housed in a casing 10 composed of dividable case parts assembled together. The casing 10 is fixed to the internal combustion engine 5. The casing 10 has a control electric motor housing part that houses the control electric motor 6, a drive electric motor housing part that houses the drive electric motor 8, and housing parts that respectively house the power-distribution planetary gear 7 and the transmission 9. The drive electric motor housing part and the housing part that houses the transmission 9 will be described later.

The control electric motor housing part, the drive electric motor housing part, the housing part that houses the power-distribution planetary gear 7, and the housing part that houses the transmission 9 are partitioned by a partition wall. The rotor shafts 13, 14, respectively attached to the rotor 11 of the control electric motor 6 and the rotor 12 of the drive electric motor 8, and are supported for free rotation via the partition wall.

The stators 15, 16 of the control electric motor 6 and the drive electric motor 8, respectively, are fixed to the inner peripheral part of the casing 10. The stators 15, 16 are each composed of cores 15a, 16a and winding wires 15b, 16b, respectively, that generate a magnetic field.

That is, the control electric motor 6 and the drive electric motor 8 are each a brushless DC motor, that include respectively the stators 15, 16. Rotors 11, 12 are provided at the inner peripheral part of the stators 15, 16 respectively, with a predetermined air gap and supported for free rotation together with the rotor shafts 13, 14.

An input shaft 17 of the hybrid drive device 2 is coupled via a damper device 18 to an output shaft 5a of the internal combustion engine 5, which is a part of the crankshaft projecting rearward. The control electric motor 6 is disposed coaxially with the input shaft 17 which is on the crankshaft.

The power-distribution planetary gear 7 is a simple planetary gear disposed coaxially with the input shaft 17, and includes a carrier (first rotary element) CR1 that is coupled to the input shaft 17 and that supports a plurality of pinion gears (planetary pinions) P1, a sun gear (second rotary element) S1 coupled to the rotor 11, and a ring gear (third rotary element) R1 that outputs a driving force. The ring gear R1 is coupled to an output shaft 19 disposed coaxially with the input shaft 17 and extending rearward.

The rotor 12 of the drive electric motor 8 is fixed to a sleeve shaft 20 fitted on the output shaft 19 and freely rotates relative to the output shaft 19. The sleeve shaft 20 serves as the input shaft of the transmission 9. The output of the transmission 9 is coupled to the output shaft 19, and the drive electric motor 8 is coupled to the output shaft 19 via the transmission 9.

As shown in FIG. 2, the transmission 9 is a so-called Ravigneaux-type planetary gear unit PU made up of a single dual planetary gear (S2, R2, SR2) and a planetary gear having a common carrier CR2 that includes a long pinion P2 in common with the dual planetary gear and a second sun gear S3. The long pinion P2 has a stepped structure having different numbers of gears.

That is, the dual planetary gear is composed of a first sun gear S2, a ring gear R2, and the common carrier CR2 that supports a short pinion P3 and the long pinion P2. The short pinion P3 is meshed with the first sun gear S2 and the ring gear R2, and a small-diameter gear P2b of the long pinion P2 is meshed with the short pinion P3. A large-diameter gear P2a of the long pinion P2 is meshed with the second sun gear S3.

The sun gear S2 is integrally formed with the sleeve shaft 20, which is spline-coupled to the rotor shaft 14 of the rotor 12 of the drive electric motor 8. The second sun gear S3 is supported for free rotation by the sleeve shaft 20 via a bushing or the like.

The common carrier CR2 is integrally fixed to the output shaft 19 through its rear plate. A cavity 19a is formed in the front end of the output shaft 19. A coupling output shaft 19b extending from the ring gear R1 (see FIG. 1) of the power-distribution planetary gear 7 is spline-fitted in the cavity 19a.

The drive electric motor 8 is housed in a case space G1 in a motor casing 22, which serves as the case main body. The transmission 9 is housed in a case space G2 made up of a rear portion 22a of the motor casing 22 and an extension housing 23.

That is, the casing 10 (see FIG. 1) of the hybrid drive device 2 includes the motor casing 22, in which the space G1 is formed to house the drive electric motor 8, and the rear portion 22a of the motor casing 22 and the extension housing 23, in both of which the space G2 is formed to house the transmission 9. The case spaces G1, G2 are separated by a partition wall 24 provided in the motor casing 22. In this embodiment, the motor casing 22 serves as the "first case part," and the rear portion 22a of the motor casing 22 and the extension housing 23 serve as the "second case part."

The rear end of the rotor shaft 14 of the rotor 12 is supported by the partition wall 24 of the motor casing 22 via a ball bearing 25 to allow free rotation. The ball bearing 25 supports, via the coupling, output shaft 19b the rotor shaft 14, the sleeve shaft 20, and a bushing. A partition wall (not shown) is provided at the front end of the rotor shaft 14. The front end of the rotor shaft 14 is supported for free rotation by the partition wall via a ball bearing.

The output shaft 19 is supported for free rotation by a boss 23a of the extension housing 23 via two ball bearings 26, 27 spaced a predetermined distance from each other.

A brake mechanism B1 is provided between the outer peripheral surface of a hub 28 and spline grooves 29 formed in the inner peripheral part of the rear part of the motor casing 22. The hub 28 extends radially outward from the front end of the second sun gear S3 and passes by the front end of the common carrier CR2.

As shown in FIG. 3, the spline grooves 29 are formed in the inner peripheral part of the motor casing 22 at regular intervals along the circumferential direction. Splines 30a are formed on the outer peripheral part of ring-shaped separator plates 30, and fitted in the spline grooves 29.

The spline grooves 29 extend along the axial direction of the coupling output shaft 19b. The separator plates 30 are stacked via friction plates 31 along the axial direction of the coupling output shaft 19b.

The friction plates 31 are provided on the outer peripheral part of the hub 28 at predetermined intervals in the axial direction of the coupling output shaft 19b, and interposed between the separator plates 30. Thus, the separator plates 30 and the friction plates 31 may be frictionally or non-frictionally engaged with each other. In this embodiment, the first brake mechanism (which may be considered the "friction engagement element" of the present invention) B1 is composed of the separator plates 30, which serve as the "first friction member", and the friction plates 31, which serve as the "second friction member."

A snap ring 32 is provided at the right side of the rightmost separator plate 30. The snap ring 32 positions the rightmost separator plate 30 in the axial direction. In FIG. 3, components such as the long pinion P2 are not shown.

In FIGS. 1 and 2, a second brake mechanism B2 is interposed between the outer peripheral surface of the ring gear R2 and the spline grooves 29 formed in the inner peripheral part of the extension housing 23. The second brake mechanism B2 includes ring-shaped separator plates 35 and friction plates 36. Splines that are fitted in the spline grooves 29 are formed on the outer peripheral part of the separator plates 35. The friction plates 36 are attached to the outer peripheral part of the ring gear R2, and interposed between the separator plates 35.

Thus, the planetary gear unit PU is disposed at the radially inner side of the first brake mechanism B1 and the second brake mechanism B2, with the first brake mechanism B1 disposed at the radially outer side of the second sun gear S3 and the large-diameter gear P2a of the long pinion P2 in such a manner as to overlap the second sun gear S3 and the large-diameter gear P2a.

A first hydraulic actuator 39 that drives the first brake mechanism B1 is disposed at a side surface of the partition wall 24 facing the first brake mechanism B1. The first hydraulic actuator 39 includes an annular recessed groove 39b formed in the side surface of the partition wall 24, and a piston 39a that is fluid-tightly fitted in the recessed groove 39.

A return spring 40 is provided in a compressed state between a retainer 39c, fixed to the partition wall 24, and the piston 39a. The return spring 40 impels the piston 39a away from the leftmost separator plate 30.

The first hydraulic actuator 39 engages the first brake mechanism B1 by pressing the separator plates 30 with the piston 39a utilizing hydraulic pressure. At this time, because the second brake mechanism B2 is disengaged, the second sun gear S3 is stationary.

In this state, rotation of the first sun gear S2 is transmitted to the short pinion P3, and the long pinion P2 is meshed with the second sun gear S3, which is stationary, so that the common carrier CR2 revolves at a regulated predetermined speed to transmit the rotation to the ring gear R2 with a small speed reduction ratio. As a result, the rotation of the ring gear R2, which has been reduced slightly is transmitted to the output shaft 19.

A hydraulic actuator 41 for the second brake mechanism B1 (second hydraulic actuator) is disposed in the rear portion of the extension housing 23, that is, between the boss 23a and the motor casing 22 that houses the transmission 9. The second hydraulic actuator 41 includes a double piston that is fluid-tightly fitted in a recessed groove 42 formed in the housing.

This double piston includes a first piston 43 disposed at the bottom of the recessed groove 42 as the cylinder bottom, a reaction plate 44 one end of which contacts the bottom of the recessed groove 42, a second piston 45 which is disposed at the reaction plate 44 as the cylinder bottom and of which inner periphery contacts the first piston 43, and a return spring 46 provided between a retainer 47 fixed to the boss 23a and the second piston 45 in the compressed state. The return spring 46 impels the second piston 45 away from the rightmost separator plate 35.

The second hydraulic actuator 41 engages the second brake mechanism B2 by pressing the separator plates 35 with the second piston 45 utilizing hydraulic pressure. At this time, because the first brake mechanism B1 is disengaged, the common carrier CR2 is stationary and the second sun gear S3 is freely rotatable. Accordingly, rotation of the first sun gear S2 is transmitted to the ring gear R2 via the pinions P2, P3 at a significantly reduced speed, and the rotation of the ring gear R2 is transmitted to the output shaft 19.

That is, in this embodiment, the hybrid drive device 2 includes a first brake mechanism B1 provided in the transmission 9 that transmits power which is input to the rotor shaft 14 to the output shaft 19 as the "rotary shaft" while changing its rotational speed.

As shown in FIG. 1, the output shaft 19 is coupled to a propeller shaft 62 via a flexible coupling 61. The propeller shaft 62 is coupled to a differential gear 63. The differential gear 63 transmits the driving force via left and right drive axles 64 to the left and the right rear wheels 4.

The control electric motor 6 functions exclusively as a generator. By controlling the electricity generation amount of the control electric motor 6, the output from the internal combustion engine 5 is transmitted to the output shaft 19 with the power-distribution planetary gear 7 variably changing gear speed.

The drive electric motor 8 functions mainly as a driving motor that supplements the driving force for the vehicle 1.

The drive electric motor 8 may also function as a generator that converts the inertial force of the vehicle 1 into electrical energy during, for example, braking of the vehicle.

The output of the internal combustion engine 5 is transmitted to the power-distribution planetary gear 7 via the damper device 18 and the input shaft 17. The power-distribution planetary gear 7 distributes the output to the control electric motor 6 and the output shaft 19. By controlling the control electric motor 6, the rotational speed output from the output shaft 19 is variably adjusted.

The output from the rotor 12 of the drive electric motor 8 is transmitted to the transmission 9 via the sleeve shaft 20, and then to the output shaft 19 after the transmission 9 changes its rotational speed in either of the two steps described above.

Then, the power from the internal combustion engine 5 distributed to the output shaft 19 via the power-distribution planetary gear 7 is supplemented with the power from the drive electric motor 8 with its rotational speed changed via the transmission 9. The power of the output shaft 19 is transmitted via the flexible coupling 61, the propeller shaft 62, and the differential gear 63 to the left and the right drive axles 64 to drive the left and the right rear wheels 4.

As shown in FIG. 2, a first supply hole 51 is formed to extend in the axial direction of the coupling output shaft 19b. The first supply hole 51 is formed on the central axis of the coupling output shaft 19b. A second supply hole 52 is formed in the extension housing 23. Lubricant discharged from an oil pump (not shown) is supplied to the second supply hole 52. The second supply hole 52 is communicated with first radial holes 53 penetrating radially outward from the first supply hole 51.

A plurality of radial holes 54 (second radial holes) are formed from the first supply hole 51. Third radial holes 55, fourth radial holes 56, and fifth radial holes 57 communicated with the second radial holes 54 are respectively formed in the rotor shaft 14, the sleeve shaft 20, and the second sun gear S3. An opening 58 is formed in the hub 28. The opening 58 communicates the space between the long pinion P2 and the hub 28 and the space between the partition wall 24 and the hub 28.

Thus, the lubricant supplied to the first supply hole 51 is supplied to the rotor 12 through the second radial holes 54 and the third radial holes 55, and to the first brake mechanism B1 sequentially through the second radial holes 54, the fourth radial holes 56, the fifth radial holes 57, and the opening 58.

In this embodiment, each of the coupling output shaft 19 having the first supply hole 51 and the second radial holes 54, the sleeve shaft 20 having the fourth radial holes 56, the second sun gear S3 having the fifth radial holes 57, and the hub 28 having the opening 58 may be considered the "lubricant supply means" of the present invention.

The first brake mechanism B1 is provided in the vicinity of the partition wall 24 because it is actuated by the first hydraulic actuator 39. In addition, the first brake mechanism B1 is provided at the inner peripheral part of the motor casing 22 because the separator plates 30 are fixed to the inner peripheral part of the motor casing 22.

In this embodiment, through holes 59 are formed in the partition wall 24 to communicate the case space G1 and the case space G2, and the through holes 59 are formed at the inner peripheral part of the motor casing 22 positioned in the vicinity of the first brake mechanism B1, so that the lubricant supplied to the first brake mechanism B1 is supplied to the winding wire 16b of the stator 16 through the through holes 59. As shown in FIG. 3, a plurality of the through holes 59 are formed in the partition wall 24 so as to communicate with the spline grooves 29, and provided along the circumferential direction of the motor casing 22. The description in the present invention "a through hole is formed in the partition wall facing the friction engagement element" means that the through holes 59 are formed in the vicinity of the first brake mechanism B1 in this embodiment.

In the embodiment configured as above, the lubricant discharged from the oil pump is supplied from the second supply hole 52 via the first radial holes 53 to the first supply hole 51, and discharged radially outward through the second radial holes 54 by a centrifugal force due to rotation of the coupling output shaft 19a, the rotor shaft 14, and the second sun gear S3.

Both a mechanical pump driven by the internal combustion engine 5 and an electric pump driven by an electric motor are used in combination. The lubricant is supplied by the electric pump when the internal combustion engine 5 is not running.

Some of the lubricant is supplied to the rotor 12 through the third radial holes 55 of the rotor shaft 14 to cool the rotor 12. Others is discharged radially outward through the fourth radial holes 56 of the sleeve shaft 20 and the fifth radial holes 57 of the second sun gear S3, thereafter discharged from the space between the hub 28 and the long pinion P2 through the opening 58 to the space between the partition wall 24 and the hub 28, and thereafter supplied to the first brake mechanism B1 to cool the first brake mechanism B1 (see the arrow M in FIG. 4).

After cooling the first brake mechanism B1, the lubricant runs against the inner peripheral part of the motor casing 22, thereafter moves along the inner peripheral part of the motor casing 22, and is discharged through the through holes 59 into the case space G1 (see the arrow M in FIG. 4). The lubricant discharged into the case space G1 cools the winding wire 16b, falls in drops, and is circulated into an oil pan (not shown).

As described above, in the hybrid drive device in accordance with this embodiment, the through holes 59 that communicate the case spaces G1, G2 are formed in the partition wall 24, and the through holes 59 are formed at the inner peripheral part of the motor casing 22 positioned in the vicinity of the first brake mechanism B1. Therefore, when lubricant is supplied to the first brake mechanism B1, the lubricant may be supplied from the case space G2 through the through holes 59 to the case space G1 (see the arrow M in FIG. 4).

Because the stator 16 is fixed to the inner peripheral part of the motor casing 22, the winding wire 16b which becomes hot may be cooled by the lubricant supplied through the through holes 59.

Thus, the lubricant supplied to the first brake mechanism B1 of the transmission 9 is supplied to the winding wire 16b positioned at the radially outer side of the rotor 12. Therefore, the system that supplies lubricant to cool the drive electric motor 8 may be simplified so that only the rotor 12 is cooled. Consequently, it is possible to prevent an increase in the capacity of the oil pump to efficiently cool the drive electric motor 8, and to prevent deterioration in the fuel economy of the vehicle 1.

In this embodiment, the spline grooves 29 formed in the inner peripheral part of the motor casing 22 are fitted with the splines 30a formed on the outer peripheral part of the separator plates 30, and the through holes 59 are formed through the partition wall 24 so as to communicate with the spline grooves 29. Therefore, a sufficient space can be secured to form the through holes 59.

In this embodiment, the partition wall 24 has only the through holes 59 formed therein. However, a pipe member may be attached to the through hole 59. Specifically, the proximal end of the pipe member may be attached to the opening end of the through hole 59 on the case space G1 side and the distal end of the pipe member may extend to the vicinity of the winding wire 16b from the proximal end.

In this way, the lubricant may be supplied to the winding wire 16b from the pipe member provided at the opening end of the through hole 59. Therefore, with the distal end of the pipe member directed toward a desired position of the winding wire 16b, the desired position of the winding wire 16b may be cooled more efficiently. The proximal end and the distal end of the pipe in accordance with this embodiment may be respectively considered as the "first end" and the "second end" of the present invention.

The case spaces G1, G2 in accordance with this embodiment may be respectively considered the "first space" and the "second space" of the present invention.

Although the case space G2 houses the transmission 9 in the first embodiment, the present invention is not limited thereto, and the case space G2 may instead house a power distribution device, as shown in the following second embodiment.

Figure 5:
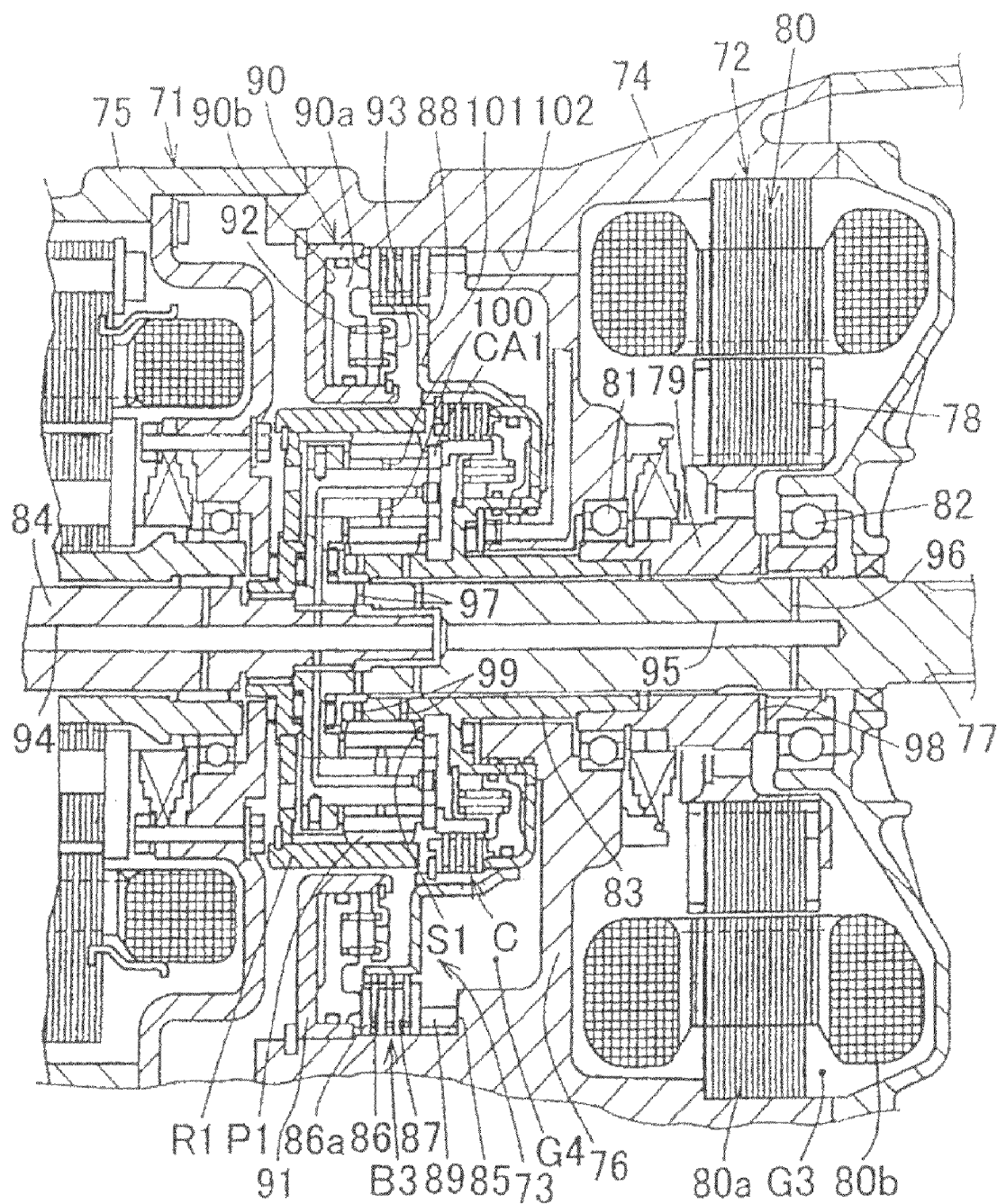
FIG. 5 is a cross sectional view of a power distribution mechanism and a control electric motor of a hybrid drive device in accordance with a second embodiment of the present invention.

FIG. 5 is a cross sectional view of a power distribution mechanism and a control electric motor of a hybrid drive device in accordance with the second embodiment of the present invention. In this embodiment, a case space that houses the power distribution mechanism and a case space that houses the control electric motor are communicated with each other via through holes.

As shown in FIG. 5, a case main body 71 includes formed therein a first case space G3 that houses a control electric motor 72, and a second case space G4 that houses a power distribution mechanism 73 as the "power distribution device." The first case space G3 is defined by the inner peripheral part of a first motor case 74 as the "first case part." The second case space G4 is defined by the inner peripheral parts of the first motor case 74 and a second motor case 75 joined to the first motor case 74 as the "second case part."

A partition wall 76 is provided in the first motor case 74 to separate the first case space G3 from the second case space G4. An input shaft 77 connected to an internal combustion engine via a damper device (not shown), is provided for free rotation in the first motor case 74. A rotor shaft 79 of a rotor 78 of the control electric motor 72 is spline-fitted on the outer peripheral part of the input shaft 77.

A core 80a of a stator 80 is fixed to the inner peripheral part of the first motor case 74. A winding wire 80b that generates a magnetic field is provided at the outer peripheral part of the core 80a. That is, the rotor 78 is provided in the inner peripheral part of the stator 80 with a predetermined air gap. The rotor shaft 79 of the rotor 78 is supported for free rotation by the first motor case 74 via ball bearings 81, 82 to rotate together with the rotor shaft 79.

The power distribution mechanism 73 is a single pinion type, and switchable between differential motion and non-differential motion by a clutch C and a brake mechanism B3.

The power distribution mechanism 73 includes rotary elements, such as a sun gear S1, a pinion gear P1, a carrier CA1 that supports the pinion gear P1 so as to rotate on its own axis and revolve around, and a ring gear R1 meshed with the sun gear S1 via the pinion gear P1.

The carrier CA1 is coupled to the internal combustion engine via the input shaft 77. The sun gear S1 is coupled via a sun gear shaft 83 to the rotor shaft 79 of the rotor 78 of the control electric motor 72. The ring gear R1 is coupled to an intermediate shaft 84 fitted on the input shaft 77 for free relative rotation.

The brake mechanism B3 is provided between the sun gear S1 and the first motor case 74. The clutch C is provided between the hub 88 and the sun gear S1 and the carrier CA1.

When the clutch C and the brake mechanism B3 are disengaged, differential motion is established in which the sun gear S1, the carrier CA1, and the ring gear R1 can rotate relative to each other. Therefore, the output of the internal combustion engine is distributed to the control electric motor 72 and the intermediate shaft 84, and the output of the internal combustion engine distributed to the control electric motor 72 causes the control electric motor 72 to generate electricity.

That is, in this embodiment, the hybrid drive device includes the brake mechanism B3 provided in the power distribution mechanism 73 that distributes the power input to the input shaft 77 as the "rotary shaft" to the rotor shaft 79 and the intermediate shaft 84 as the "output shaft."

Spline grooves 85 are formed in the inner peripheral part of the first motor case 74 at regular intervals along the circumferential direction. Splines 86a are formed on the outer peripheral part of ring-shaped separator plates 86, and fitted in the spline grooves 85.

The spline grooves 85 extend along the axial direction of the input shaft 77. The separator plates 86 are stacked via friction plates 87 along the axial direction of the input shaft 77.

The friction plates 87 are provided on the outer peripheral part of the hub 88 at predetermined intervals in the axial direction of the input shaft 77, and interposed between the separator plates 86. In this embodiment, the brake mechanism (which corresponds to the "friction engagement element" of the present invention) B3 is composed of the separator plates 86, which serve as the "first friction member", and the friction plates 87, which serve as the "second friction member."

A stopper member 89 is provided at the right side of the rightmost separator plate 86. The stopper member 89 positions the rightmost separator plate 86 in the axial direction.

A third hydraulic actuator 90 that drives the brake mechanism B3 is disposed at the inner peripheral part of the first motor case 74. The third hydraulic actuator 90 includes a cylinder member 91 having an annular recessed groove 90b, and a piston 90a that is fluid-tightly fitted in the recessed groove 90b of the cylinder member 91.

A return spring 92 is provided in a compressed state between a retainer 93 fixed to the cylinder member 91 and the piston 90a. The return spring 92 impels the piston 90a away from the leftmost separator plate 86.

The third hydraulic actuator 90 engages the brake mechanism B3 by pressing the separator plates 86 with the piston 90a utilizing hydraulic pressure. At this time, the output of the internal combustion engine is distributed to the control electric motor 72 and the intermediate shaft 84 as described above.

A third supply hole 94 and a fourth supply hole 95 are respectively formed in the intermediate shaft 84 and the input shaft 77 in the axial direction. Lubricant discharged from an oil pump is supplied to the third supply hole 94 and the fourth supply hole 95.

The fourth supply hole 95 is communicated with fifth radial holes 96 and sixth radial holes 97 penetrating radially outward therefrom. The fifth radial holes 96 are communicated with seventh radial holes 98 formed in the rotor shaft 79. The sixth radial holes 97 are communicated with eighth radial holes 99 formed in the sun gear shaft 83. The eighth radial holes 99 are communicated with ninth radial holes 100 penetrating the sun gear S1, the pinion gear P1, and the ring gear R1.

An opening 101 is formed in the hub 88. The opening 101 guides the lubricant discharged from the ninth radial holes 100 to the brake mechanism B3. In this embodiment, the "lubricant supply means" is composed of the intermediate shaft 84 having the third supply hole 94, the fifth radial holes 96, and the sixth radial holes 97, the input shaft 77 having the fourth supply holes 95, the rotor shaft 79 having the seventh radial holes 98, the sun gear shaft 83 having the eighth radial holes 99, the sun gear S1, the pinion gear P1, and the ring gear R1 having the ninth radial holes 100, and the hub 88 having the opening 101.

Through holes 102 are formed in the partition wall 76. The through holes 102 communicate the first case space G3 and the second case space G4. The through holes 102 are formed at the inner peripheral part of the first motor case 74 positioned in the vicinity of the brake mechanism B3. The through holes 102 introduce the lubricant supplied to the brake mechanism B3 from the first case space G3 into the second case space G4 to cool the winding wire 80b of the stator 80.

As in the first embodiment, the through holes 102 are formed in the partition wall 76 so as to communicate with the spline grooves 85. The same number of through holes 102 as there are of the spline grooves 85 may be provided.

In the above embodiment, the lubricant discharged from the oil pump is supplied through the third supply hole 94 and the fourth supply hole 95 to the fifth radial holes 96. The lubricant is discharged radially outward through the seventh radial holes 98 by a centrifugal force due to rotation of the input shaft 77 and the rotor shaft 79, and supplied to the rotor 78 to cool the rotor 78.

The lubricant discharged from the sixth radial holes 97 is discharged radially outward of the ring gear R1 through the eighth radial holes 99 and the ninth radial holes 100 by a centrifugal force due to rotation of the input shaft 77, the sun gear S1, the pinion gear P1, and the ring gear R1, and thereafter supplied through the opening 101 to the brake mechanism B3 to cool the brake mechanism B3.

After cooling the brake mechanism B3, the lubricant runs against the inner peripheral part of the motor case 74, and is discharged through the through holes 102 into the first case space G3. The lubricant discharged into the first case space G3 cools the winding wire 80b, and is the collected in an oil pan (not shown).

As described above, in the hybrid drive device in accordance with this embodiment, the through holes 102 that communicate the first case space G3, the second case space G4 are formed in the partition wall 76, and the through holes 102 are formed at the inner peripheral part of the first motor case 74 positioned in the vicinity of the brake mechanism B3. Therefore, when lubricant is supplied to the brake mechanism B3, the lubricant may be supplied from the second case space G4 through the through holes 102 to the first case space G3.

Because the stator 80 is fixed to the inner peripheral part of the first motor case 74, the winding wire 80b which becomes hot is cooled by the lubricant supplied through the through holes 102.

Thus, the lubricant supplied to the brake mechanism B3 of the power distribution mechanism 73 may be supplied to the winding wire 80b positioned at the radially outer side of the rotor 78. Therefore, the system that supplies lubricant to cool the control electric motor 72 may be may be simplified so that only the rotor 78 is cooled. Consequently, it is not necessary to increase in the capacity of the oil pump to efficiently cool the control electric motor 72, which avoids deterioration in the fuel economy of the vehicle.

In this embodiment, the spline grooves 85 are formed in the inner peripheral part of the first motor case 74 to be fitted with the splines 86a formed on the outer peripheral part of the separator plates 86, and the through holes 102 are formed through the partition wall 76 so as to communicate with the spline grooves 85. Therefore, a sufficient space is provided to form the through holes 102.

The first case space G3, the second case space G4 in accordance with this embodiment may be respectively considered as the "first space" and the "second space" of the present invention.

In this embodiment, only the through holes 102 are formed in the partition wall 76. However, a pipe member may be attached to the through hole 102. Specifically, the proximal end of the pipe member may be attached to the opening end of the through hole 102 on the first case space G3 side and the distal end of the pipe member may be extended to the vicinity of the winding wire 80b from the proximal end.

In this way, the lubricant is supplied to the winding wire 80b from the pipe member provided at the opening end of the through hole 102. Therefore, with the distal end of the pipe member directed toward a desired position of the winding wire 80b, the desired position of the winding wire 80b may be easily cooled more efficiently. The proximal end and the distal end of the pipe member in accordance with this embodiment may be respectively considered as the "first end" and the "second end" of the present invention.

Although two case spaces are divided by one partition wall and a through hole is formed to communicate the case spaces in the above embodiments, the control electric motor, the power distribution device, the drive electric motor, and the transmission may be housed in four case spaces divided by partition walls and a through hole may be formed in each partition wall to communicate adjacent case spaces.

As has been described above, the hybrid drive device in accordance with the present invention has the effects of more efficiently cooling an electric motor without requiring an increase in the capacity of an oil pump, thus avoiding deterioration in the fuel economy of a vehicle. The hybrid drive device in accordance with the present invention is useful as a hybrid drive device or the like mounted on a hybrid vehicle to improve the cooling performance for the winding wire of a stator.

While the invention has been described with reference to example embodiments thereof, it should be understood that the invention is not limited to the example embodiments or constructions. To the contrary, the invention is intended to cover various modifications and equivalent arrangements. In addition, while the various elements of the example embodiments are shown in various combinations and configurations, which are example, other combinations and configurations, including more, less or only a single element, are also within the spirit and scope of the invention.

The invention claimed is:

1. A hybrid drive device comprising:
   a case main body having i) at least one partition wall, ii) a first case part and iii) a second case part in which a first space and a second space divided by the partition wall are respectively formed;
   an electric motor that includes i) a stator fixed to the first case part and having a winding wire, ii) a rotor shaft provided in the stator for free rotation, and iii) a rotor fixed to the rotor shaft;
   a rotary shaft being coaxial with the rotor shaft and rotatable together with the rotor shaft;
   a friction engagement element that includes i) a first friction member spline-coupled to an inner peripheral part of the second case part, ii) a hub supported by the rotary shaft, and iii) a second friction member that is spline-coupled to the hub and that is frictionally or non-frictionally engaged with the first friction member; and
   lubricant supply portion that supplies lubricant to the friction engagement element, the friction engagement element being provided in the vicinity of the partition wall, wherein:
   a through hole that communicates the first space and the second space is formed in the partition wall while facing the friction engagement element, and
   the lubricant is supplied to the friction engagement element, and subsequently the lubricant is supplied to the second space, the through hole, and the first space in sequence to cool the winding wire.

2. The hybrid drive device according to claim 1, wherein the through hole is formed in the partition wall at an inner peripheral part of the case main body.

3. The hybrid drive device according to claim 1, wherein the stator is fixed to an inner peripheral part of the first case part.

4. The hybrid drive device according to claim 1, wherein the lubricant supply portion supplies some of the lubricant to the friction engagement element while supplying others to cool the rotor.

5. The hybrid drive device according to claim 1, wherein the friction engagement element controls power input to the hub by serving as a part of a transmission that transmits power which is input to the rotor shaft to the rotary shaft after changing gear speed.

6. The hybrid drive device according to claim 1, wherein the friction engagement element controls power input to the hub by serving as a part of a power distribution device that distributes power which is input to the rotary shaft to the rotor shaft and an output shaft.

7. The hybrid drive device according to claim 1, wherein the friction engagement element is a brake mechanism.

8. The hybrid drive device according to claim 1, wherein:
   a spline groove is formed in the inner peripheral part of the second case part, a spline is formed on an outer peripheral part of the first friction member, the spline is fitted with the spline groove; and
   the through hole is formed in the partition wall so as to communicate with the spline groove.

9. The hybrid drive device according to claim 8, wherein a plurality of the through holes is provided along a circumferential direction of the first case part.

10. The hybrid drive device according to claim 8, wherein the same number of through holes as there are spline grooves is provided.

11. The hybrid drive device according to claim 1, further comprising a pipe member having a first end and a second end, wherein the first end is attached to an opening end of the through hole on the first case part side, and the second end extends toward the winding wire from the first end.

* * * * *